March 15, 1932.   J. SOSS   1,849,536
HINGE BEARING STRUCTURE
Filed Dec. 18, 1930
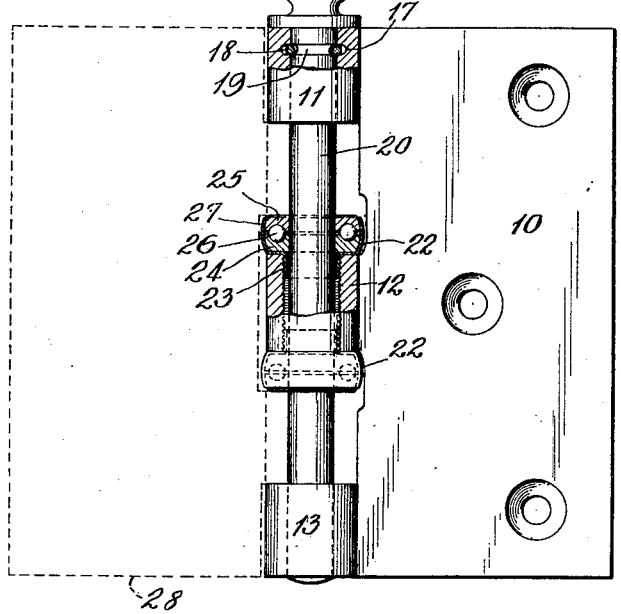
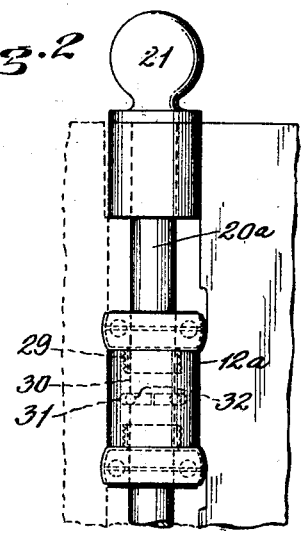
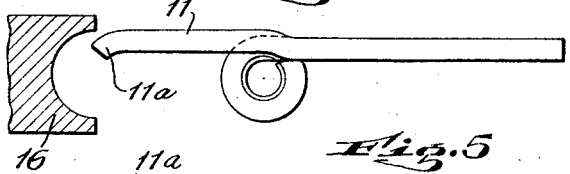
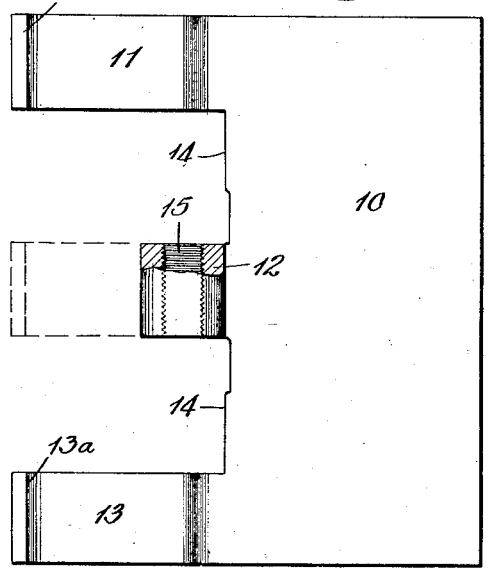
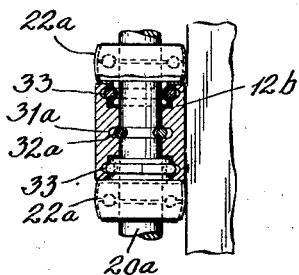
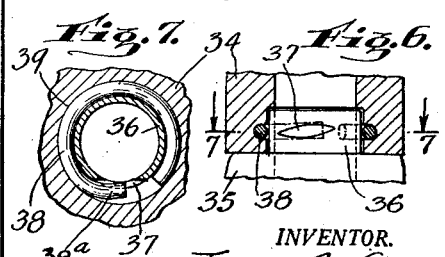
INVENTOR.
Joseph Soss.
BY
ATTORNEY Patented Mar. 15, 1932

1,849,536

UNITED STATES PATENT OFFICE

JOSEPH SOSS, OF ROSELLE, NEW JERSEY

HINGE BEARING STRUCTURE

Application filed December 18, 1930. Serial No. 503,115.

This invention relates to hinges and particularly to what are known as ball bearing hinges employing one or more ball bearings disposed between the knuckles of companion butts of a hinge; and the object of the invention is to provide a novel method of coupling the ball bearing units with one of the pintle bearings or knuckles of the hinge; a further object being to provide an improved means of coupling and retaining the pintle pin against displacement with respect to the butts in the use of the hinge; a further object of the invention being to provide a novel means of shaping and forming the butt of the hinge to which the ball bearing units are attached; and with these and other objects in view, the invention consists in a hinge of the class and for the purpose specified, which is simple in construction, efficient in use and which is constructed as hereinafter more fully described and claimed.

The invention is fully disclosed in the following specification of which the accompanying drawings form a part in which the separate parts of my improvement are designated by suitable reference characters in each of the views, and in which:

Fig. 1 is a face view of one butt of a hinge with part of the construction broken away and in section and indicating the companion butt in dotted lines.

Fig. 2 is a view similar to Fig. 1 but showing only a part of the construction and showing a modification.

Fig. 3 is a sectional, detail view of another form of construction which I employ.

Fig. 4 is an edge view of the hinge butt shown in Fig. 1, partially formed and indicating one of the steps in the process of making the same.

Fig. 5 is a side and sectional view of the partially formed butt shown in Fig. 4.

Fig. 6 is an enlarged, sectional, detail view of a part of one knuckle of a hinge showing another method of attaching a ball bearing unit thereto; and, Fig. 7 is a partial section on the line 7—7 of Fig. 6.

In making a hinge according to my invention, I provide elongated strip material which is blanked to form on one workpiece which forms the butt 10, three projecting members 11, 12 and 13 forming spaces between the outer members 11 and 13 and the intermediate member 12 to receive the bearing knuckles of the other butt of the hinge as well as the ball bearings as later described.

In the process of shaping the butt 10 formed as above set out, the central member 12 is first curled to form the central cylindrical bearing. The members 11 and 13 are offset laterally so as to give access to the bore of the bearing or knuckle 12 to permit the cutting of threads 15 in said bore or to perform other operations as later described. The result of this offsetting of the members 11 and 13 is indicated in Fig. 4 of the drawings.

It will be noted that the free end of each of said members is slightly curved or curled as seen at 11a and 13a so as to facilitate the curling of said members to form the end knuckles or bearings of the butt after the machine or other operations have been performed in the bearing 12. A suitable curling die 16 is employed for this purpose. It is preferred that the bore of the bearing or knuckle 11 be provided with an annular groove 17 to receive a spring ring 18, cooperating with a groove 19 on a pintle pin 20 to retain said pin against accidental displacement from the separate butts. The pin 20 has a head 21 disposed at one end of the complete butt.

In completing the formation of the butt 10, two ball bearing units 22 of similar construction are coupled with the upper and lower ends of the central bearing 12, each unit having an externally threaded sleeve portion 23 adapted to engage the threads 15 of the bearing 12 to retain the units against displacement from said bearing. Each unit consists of inner and outer ball races 24 and 25 with bearing balls 26 disposed therebetween. A collar 27 is employed for holding the separate races 24 and 25 against displacement with respect to each other. The collar 27 is integral with the sleeve portion 23 in the construction shown. The arc-shaped formation of the collar 27 cooperating with similar surfaces on the ball races serves to retain said parts in proper position.

With this construction, the bearing units 22 may be quickly attached to the upper and lower ends of the bearing 12; and when attached, the other butt 28 of the hinge indicated in dotted lines in Fig. 1 of the drawings will be coupled with the butt 10 by passing the pintle pin 20 through the bearings of the butt 28 and the bearings 11, 12 and 13. In this connection, it will be understood that the spring ring 18 will pass freely into the bore of the bearing 11, being arranged in the groove 19 of the pin 20, and later snapped into the groove 17.

In Fig. 2 of the drawings, I have shown a slight modification in the manner of forming the central bearing 12a of the hinge butt, which consists simply in threading each end of the bore of said bearing as indicated at 29 instead of threading the bore throughout the entire length of the bearing. The plain intermediate surface 30 of the bearing is provided with a groove 31 in connection with which a spring ring 32 arranged on a groove in the pintle pin 20a is adapted to operate to key the pin against displacement from the butt. This eliminates the use of the grooves 17 and 19 and the spring ring 18.

In Fig. 3 of the drawings, the manner of keying the pin 20a to the central bearing of the hinge butt as indicated in Fig. 2 of the drawings is shown clearly in section. In this figure, 12b represents the central bearing, 31a a groove in said bearing and 32a the spring ring seating in a groove in the pintle pin 20a. In the construction shown in Fig. 3 of the drawings, the two bearing units 22a are substantially of the same construction as the units 22 shown in Figs. 1 and 2 of the drawings except that, instead of threading the sleeve portions of said units into the opposite ends of the bearing 12b, said sleeve portions are grooved to receive spring rings 33 which are adapted to seat in corresponding grooves formed in the bore of the bearing 12b to retain the ball bearing units against displacement from the bearing or knuckle 12b.

From the foregoing, it will be apparent that the distinctive features of my invention reside in the provision of means for quickly attaching the ball bearing units to the knuckle or bearing of the hinge butt and to provide a novel means of forming the hinge butt and shaping or otherwise forming the bearing of the butt in connection with which the ball bearing units are mounted.

In Figs. 6 and 7 of the drawings, I have shown another method of attaching a ball bearing unit or units to the pintle knuckle of a hinge. In said figure, 34 represents a part of the knuckle, 35 the ball bearing unit including a sleeve portion 36 extending into the bore of the knuckle 34, the periphery of the sleeve 36 having at one point an inclined circumferential slot or notch 37. A spring ring 38 is mounted in a ring groove 39 formed in the knuckle 34, and one end 38a of said spring is adapted to engage the notch 37 to retain the bearing unit 35 against displacement from the knuckle. By virtue of the inclination of the notch 37, the bearing may be rotated in thread-like fashion with respect to the spring end 38a to securely retain the bearing 35 in connection with the knuckle.

While I have shown certain forms of construction for carrying my invention into effect, it will be understood that I am not necessarily limited to the structural details herein shown and described and various changes in and modifications of the construction herein set out may be made within the scope of the appended claims without departing from the spirit of my invention or sacrificing its advantages.

Having fully described my invention, what I claim as new and desire to secure by Letters Patent, is:—

1. A ball bearing unit for mounting on one end of a cylindrical hinge knuckle, said unit comprising a cup-shaped casing, ball bearing elements within said casing, a reduced tubular body extending from one side of the casing and adapted to enter the bore of a hinge knuckle in securing said casing and bearing unit against accidental displacement from said knuckle, the bore of said knuckle having an annular groove adjacent the tubular body, said tubular body including a recess adapted to register with said groove, a spring ring disposed in said groove and cooperating with said recess in retaining said casing against displacement from the knuckle, and the recess in said tubular body being angularly disposed to provide a camming engagement of the bearing unit with said knuckle.

2. A bearing unit for hinges having cylindrical knuckles comprising races with bearing balls disposed therebetween, means for retaining the races against separation, and said bearing unit including a sleeve portion projecting at one side of the unit, means involving a spring ring seating in the bore of the hinge knuckle and engaging said projecting sleeve portion for detachably mounting said unit in connection with the hinge knuckle, and said sleeve portion including an angularly disposed recess in connection with which said spring ring operates.

3. A bearing unit for hinges having cylindrical knuckles comprising races with bearing balls disposed therebetween, means for retaining the races against separation, and said bearing unit including a sleeve portion projecting at one side of the unit, means involving a spring ring seating in the bore of the hinge knuckle and engaging said projecting sleeve portion for detachably mounting said unit in connection with the hinge knuckle, said sleeve portion including an angularly disposed recess in connection with which said spring ring operates, and one end of said spring ring being set inwardly to engage the recess in said sleeve portion.

4. A ball bearing unit for hinges of the class described comprising two ball races with bearing balls disposed therebetween, a cup-shaped casing in which said races and bearing balls are mounted, said casing engaging the races to retain the same against separation, one of the races being exposed at one side of the casing, the other closed side of said casing including an integral, projecting sleeve, and said sleeve having a circumferentially arranged and inclined recess facilitating the detachable engagement of the bearing and unit in connection with a support.

In testimony that I claim the foregoing as my invention I have signed my name this 10th day of December, 1930.

JOSEPH SOSS.